US010861360B2

(12) United States Patent
Lee et al.

(10) Patent No.: US 10,861,360 B2
(45) Date of Patent: Dec. 8, 2020

(54) DISPLAY DEVICE AND METHOD OF DRIVING THE SAME

(71) Applicant: Samsung Display Co., Ltd., Yongin-Si (KR)

(72) Inventors: Jaehoon Lee, Seoul (KR); Kyoungho Lim, Suwon-si (KR); Seokha Hong, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 149 days.

(21) Appl. No.: 16/058,225

(22) Filed: Aug. 8, 2018

(65) Prior Publication Data

US 2019/0057631 A1 Feb. 21, 2019

(30) Foreign Application Priority Data

Aug. 16, 2017 (KR) ........................ 10-2017-0103763

(51) Int. Cl.
*G06F 3/038* (2013.01)
*G09G 3/00* (2006.01)
*G09G 3/36* (2006.01)

(52) U.S. Cl.
CPC ........... *G09G 3/006* (2013.01); *G09G 3/3688* (2013.01); *G09G 2320/029* (2013.01); *G09G 2320/0223* (2013.01); *G09G 2330/12* (2013.01)

(58) Field of Classification Search
CPC ................. G09G 3/006; G09G 3/3688; G09G 2320/0223; G09G 2320/029
USPC .......................................................... 345/215
See application file for complete search history.

(56) References Cited

U.S. PATENT DOCUMENTS 9,465,463 B2 10/2016 Lee
2011/0205221 A1* 8/2011 Lin ...................... G09G 3/3225 345/213
2016/0070147 A1 3/2016 Kim et al.
2016/0140898 A1* 5/2016 Hyun .................. G09G 3/3233 345/694
2016/0240132 A1* 8/2016 Takahiro ................ G09G 3/325
2017/0039939 A1* 2/2017 Chaji ................... G09G 3/3225
(Continued)

FOREIGN PATENT DOCUMENTS

KR 101370044 B1 3/2014
KR 1020160029994 A 3/2016
KR 101670402 B1 10/2016
(Continued)

*Primary Examiner* — Jonathan M Blancha
(74) *Attorney, Agent, or Firm* — Cantor Colburn LLP

(57) ABSTRACT

A display device includes a pixel column including first to n-th pixels connected to a same data line and different gate lines from each other, a data driving chip which outputs a test data voltage in a test mode and outputs image data voltages in a normal mode, a sensing circuit which is electrically connected to the data line and the data driving chip in the test mode, senses a current output to the first pixel during a first period, and senses a current output to an i-th pixel during a second period, and a signal controller which compares a reference charge amount calculated based on the current sensed during the first period to a first charge amount calculated based on the current sensed during the second period and compensates for a level of an image data voltage applied to the i-th pixel among the image data voltages based on the compared result.

20 Claims, 14 Drawing Sheets

(56) References Cited

U.S. PATENT DOCUMENTS

| | | | | |
|---|---|---|---|---|
| 2017/0115808 | A1 | 4/2017 | Cho et al. | |
| 2018/0174522 | A1* | 6/2018 | Lee | G09G 3/3291 |

FOREIGN PATENT DOCUMENTS

| | | | |
|---|---|---|---|
| KR | 1020170015649 | A | 2/2017 |
| KR | 1020170049723 | A | 5/2017 |

* cited by examiner

FIG. 10

| | Sensing current (IS) | Designated charge amount (Qr) | Error (Qt/Qr)(%) | Image data voltage before compensation (DS) | Image data voltage after compensation (DS') |
|---|---|---|---|---|---|
| First pixel (PX11) | First current (IS1) | First designated charge amount (Qr1) | 0% | First voltage (V1) | First voltage (V1') |
| i pixel (PXi1) | Second current (IS2) | Second designated charge amount (Qr2) | -0.1% | Second voltage (V2) | Second voltage (V2') |
| k pixel (PXk1) | Third current (IS3) | Third designated charge amount (Qr3) | -0.2% | Third voltage (V3) | Third voltage (V3') |

DISPLAY DEVICE AND METHOD OF DRIVING THE SAME

This application claims priority to Korean Patent Application No. 10-2017-0103763, filed on Aug. 16, 2017, and all the benefits accruing therefrom under 35 U.S.C. § 119, the content of which in its entirety is herein incorporated by reference.

BACKGROUND

1. Field

Exemplary embodiments of the invention relate to a display device. More particularly, exemplary embodiments of the invention relate to a display device and a method of driving the display device.

2. Description of the Related Art

As information technology develops, a market for display devices that serve as a connection between a user and information continues to increase. Accordingly, various display devices, e.g., an organic light emitting display device, a liquid crystal display ("LCD") device, a plasma display panel, etc., are widely used.

Some of the above-mentioned display devices, for example, the LCD device or the organic light emitting display device, include a display panel including pixels arranged in a matrix form and a driver driving the display panel. The driver includes a gate driving circuit that applies a scan signal (or a gate signal) to the display panel and a data driving circuit that applies a data signal to the display panel. When the gate signal and the data signal are applied to the pixels arranged in the matrix form, selected pixels emit lights, and thus the display device displays an image.

SUMMARY

A resolution of a display panel goes beyond ultra high definition ("UHD") to quad ultra-high definition ("QUHD") as demands for high resolution displays is growing not only for small-size panels but also for large-size panels, and thus a screen size of the display device exceeds about 100 inches. As the resolution of the display panel increases due to preference for high resolution, a charging time of the pixels is reduced. As a result, a compensation scheme for a data voltage is desired by taking into account an RC time constant.

Exemplary embodiments of the invention provide a display device capable of preventing a data voltage from being insufficiently charged to a pixel due to an RC delay in high resolution and large area.

Exemplary embodiments of the invention provide a method of driving the display device.

Exemplary embodiments of the invention provide a display device including a pixel column including first to n-th pixels connected to a data line and respectively connected to gate lines, a data driving chip which outputs a test data voltage in a test mode and outputs image data voltages in a normal mode, a sensing circuit which is electrically connected to the data line and the data driving chip in the test mode, senses a current output to the first pixel by the test data voltage during a first period, and senses a current output to an i-th pixel by the test data voltage during a second period shorter than the first period, and a signal controller which compares a reference charge amount calculated based on the current sensed during the first period to a first charge amount calculated based on the current sensed during the second period and compensates for a level of an image data voltage applied to the i-th pixel among the image data voltages based on a compared result.

In an exemplary embodiment, the pixel column further includes a first pixel group and a second pixel group, and the signal controller compensates for a level of the image data voltages applied to the pixels of the first pixel group based on a compared result between the reference charge amount and the first charge amount.

In an exemplary embodiment, the pixel column further includes a third pixel group, and the signal controller constantly maintains a level of the image data voltages applied to the pixels of the third pixel group based on the compared result between the reference charge amount and the first charge amount.

In an exemplary embodiment, the sensing circuit senses a current output to a k-th pixel by the test data voltage in the test mode during the second period, and the signal controller compares the reference charge amount to a second charge amount calculated by sensing the current output to the k-th pixel during the second period and compensates for the level of the image data voltages applied to the pixels of the second pixel group based on the compared result between the reference charge amount and the second charge amount.

In an exemplary embodiment, each of the pixel column and the sensing circuit is provided in a plural number, and the sensing circuits are respectively connected to the pixel columns in the test mode.

In an exemplary embodiment, the signal controller applies a test image signal corresponding to the test data voltage to the data driving chip in the test mode and applies image signals corresponding to the image data voltages to the data driving chip in the normal mode.

In an exemplary embodiment, the display device further includes a switch which electrically connects the data driving chip to the pixel column in the normal mode and electrically separates the data driving chip from the pixel column in the test mode.

In an exemplary embodiment, the display device further includes a sensing switch which electrically separates the sensing circuit from the data driving chip and electrically connects the sensing circuit to the data driving chip in the test mode.

In an exemplary embodiment, the sensing switch includes a first sensing switch and a second sensing switch, which are connected to the sensing circuit, the first sensing switch electrically connects or separates the data driving chip to or from the sensing circuit, and the second sensing switch electrically connects or separates the sensing circuit to or from the pixel column.

In an exemplary embodiment, the signal controller outputs a first switching control signal to control an operation of the switch and a second switching control signal to control an operation of the sensing switch.

In an exemplary embodiment, the switch is turned on in response to an active level of the first switching control signal in the normal mode, the switch is turned off in response to an inactive level of the first switching control signal in the test mode, the sensing switch is turned off in response to an inactive level of the second switching control signal in the normal mode, and the sensing switch is turned on in response to an active level of the second switching control signal in the test mode.

In an exemplary embodiment, the signal controller includes a compensation circuit electrically connected to the sensing circuit to calculate the reference charge amount and the first charge amount.

In an exemplary embodiment, the compensation circuit stores information about the reference charge amount of at least one pixel among the first to n-th pixels.

In an exemplary embodiment, the compensation circuit includes a charge amount calculator which calculates the reference charge amount and the first charge amount, a comparator which compares the reference charge amount to the first charge amount, and a compensator which compensates for the level of the image data voltage applied to the i-th pixel based on the compared result between the reference charge amount and the first charge amount.

In an exemplary embodiment, the second period is a time during which the compensated image data voltage is charged in the i-th pixel in the normal mode.

Exemplary embodiments of the invention provide a method of driving a display device including sensing a current output to a first pixel by a test data voltage output from a data driving chip among first to n-th pixels connected to a data line and respectively connected to gate lines during a first period in a test mode, sensing a current output to an i-th pixel by the test data voltage among the first to n-th pixels during a second period shorter than the first period in the test mode, comparing a reference charge amount calculated based on the current sensed during the first period to a designated charge amount calculated based on the current sensed during the second period, and compensating for a level of the image data voltage applied to the i-th pixel from the data driving chip based on the compared result in the normal mode.

In an exemplary embodiment, the method further includes determining whether the test mode and the normal mode are performed, the data driving chip outputs the image data voltages in the normal mode, and the data driving chip outputs the test data voltage in the test mode.

In an exemplary embodiment, when the reference charge amount is greater than the designated charge amount, the compensating is performed, and when the reference charge amount is smaller than the designated charge amount, the normal mode is performed.

In an exemplary embodiment, a switch which electrically connects the data driving chip to the first to n-th pixels is turned on in the normal mode and turned off in the test mode.

In an exemplary embodiment, a sensing switch which electrically connects the data driving chip to each of the first to n-th pixels is turned off in the normal mode and turned on in the test mode.

According to the above, the level of the data voltage applied to the pixel may be compensated based on the difference between the reference charge amount calculated based on the current sensed during the first period and the designated charge amount calculated based on the current sensed during the second period.

Accordingly, an overall driving reliability of the display device may be improved.

BRIEF DESCRIPTION OF THE DRAWINGS

The above and other advantages of the invention will become readily apparent by reference to the following detailed description when considered in conjunction with the accompanying drawings, in which:

FIG. 10 is a table showing an exemplary embodiment of a compensated image data voltage compensated according to the invention;

DETAILED DESCRIPTION

Figure 1:
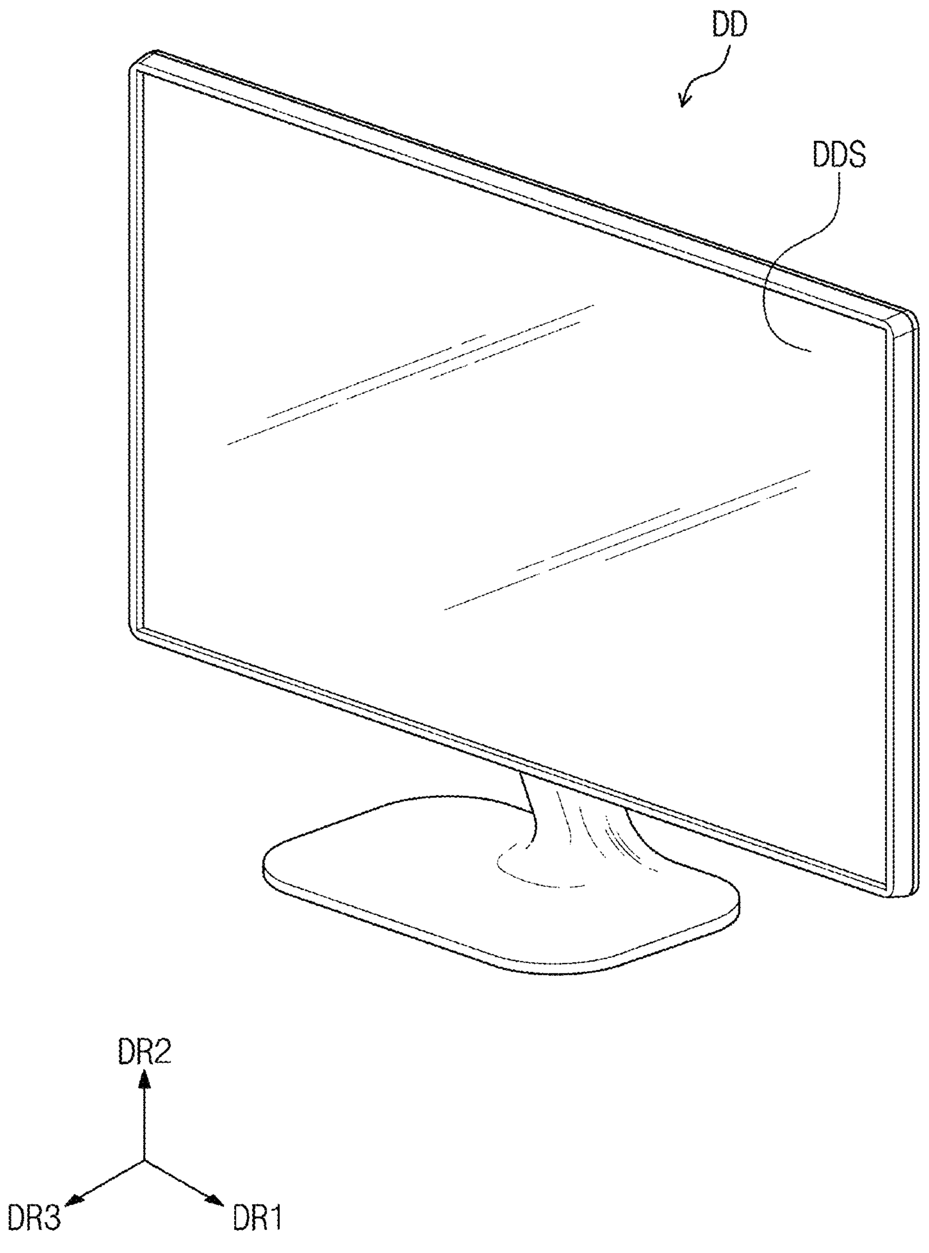
FIG. 1 is a perspective view showing an exemplary embodiment of a display device according to the invention.

The disclosure may be variously modified and realized in many different forms, and thus specific embodiments will be exemplified in the drawings and described in detail hereinbelow. However, the disclosure should not be limited to the specific disclosed forms, and be construed to include all modifications, equivalents, or replacements included in the spirit and scope of the invention.

Like numbers refer to like elements throughout. In the drawings, the thickness of layers, films, and regions are exaggerated for clarity. As used herein, the term "and/or" includes any and all combinations of one or more of the associated listed items. The use of the terms first, second, etc. do not denote any order or importance, but rather the terms first, second, etc. are used to distinguish one element from another. Thus, a first element, component, region, layer or section discussed below could be termed a second element, component, region, layer or section without departing from the teachings of the invention. It is to be understood that the singular forms "a," "an," and "the" include plural referents unless the context clearly dictates otherwise.

It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

It will be understood that when an element is referred to as being "on" another element, it can be directly on the other element or intervening elements may be therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. In an exemplary embodiment, when the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, then the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in quest n d the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. In an exemplary embodiment, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

Hereinafter, the invention will be explained in detail with reference to the accompanying drawings.

Figure 2:
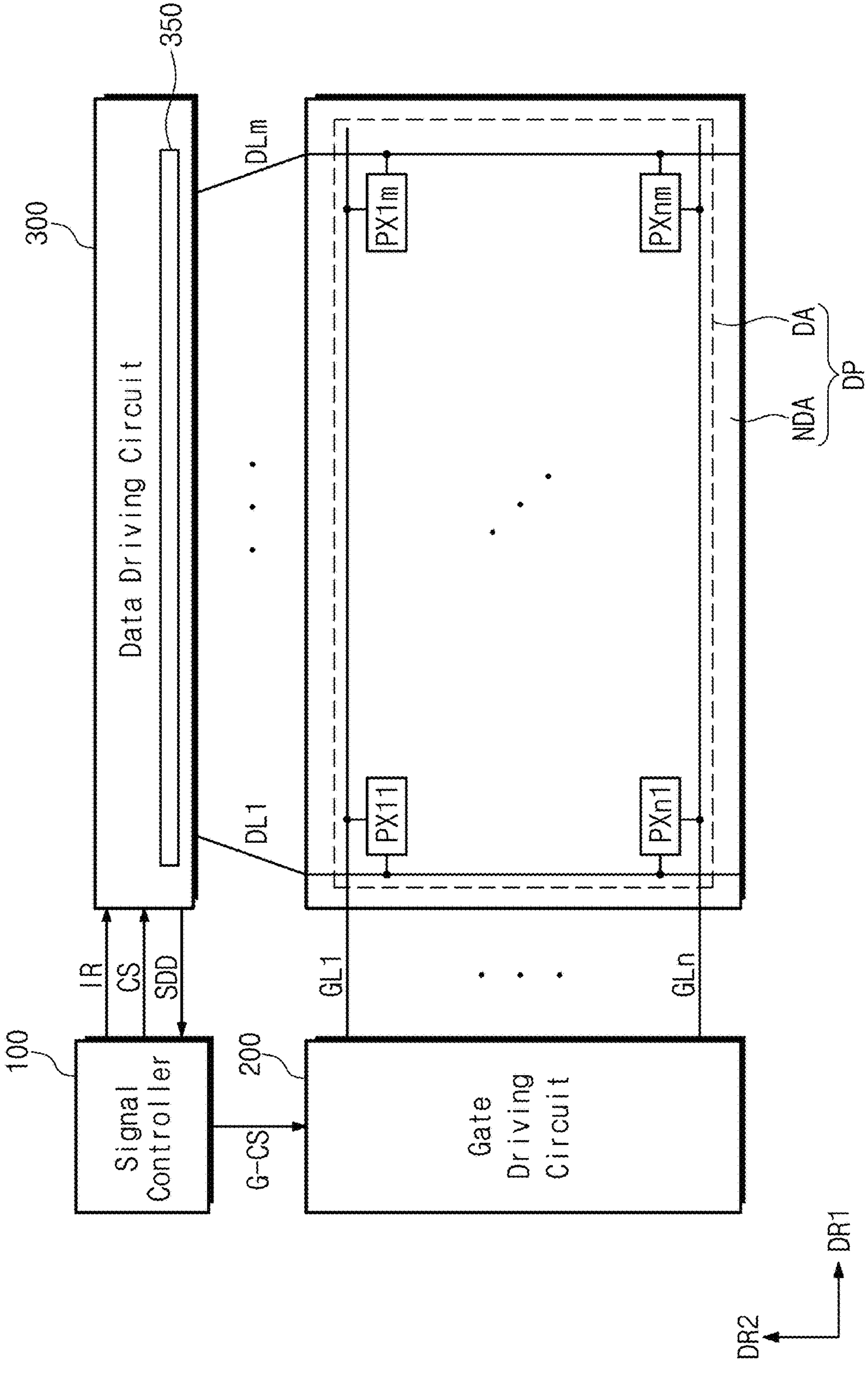
FIG. 2 is a block diagram showing an exemplary embodiment of a display device according to the invention.
Figure 3:
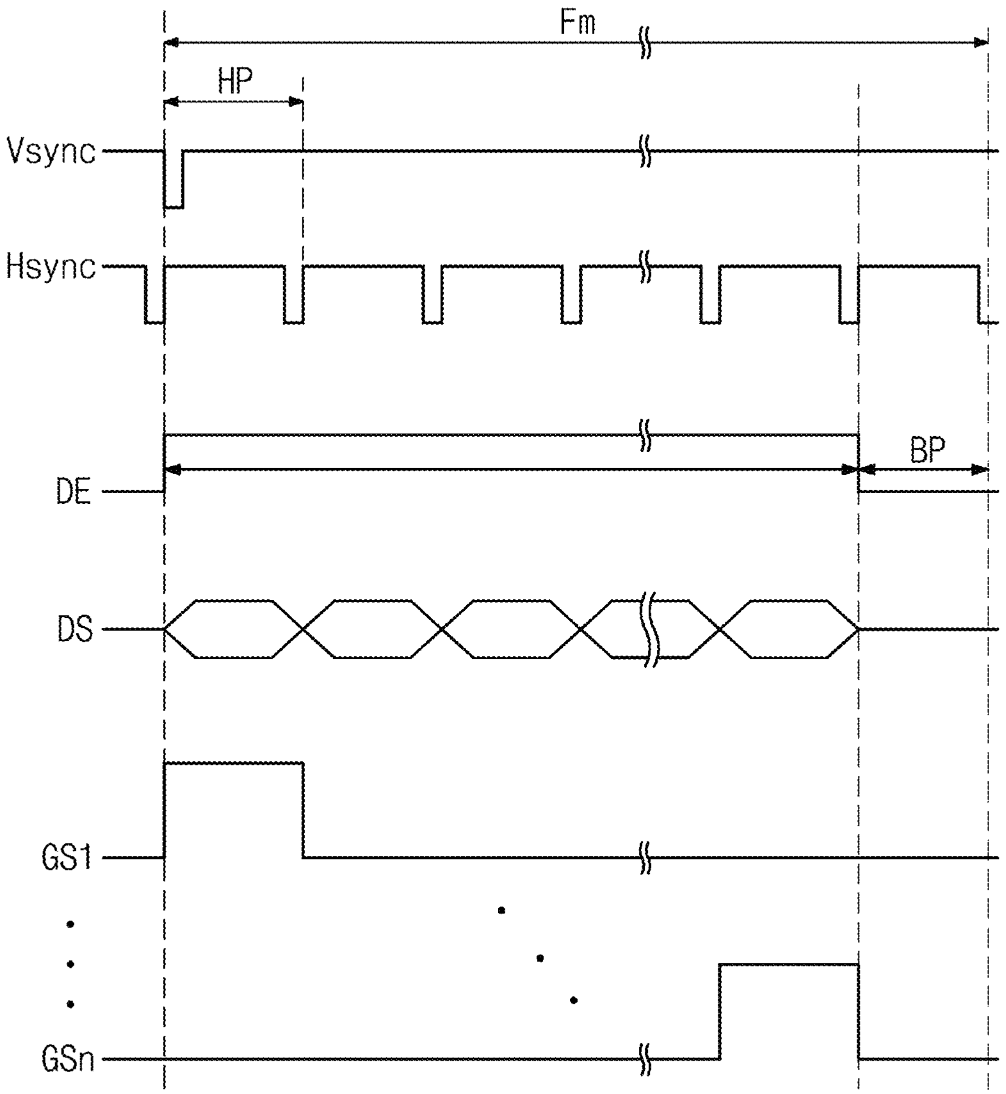
FIG. 3 is a timing diagram showing an exemplary embodiment of an operation of a display device according to the invention.
Figure 4:
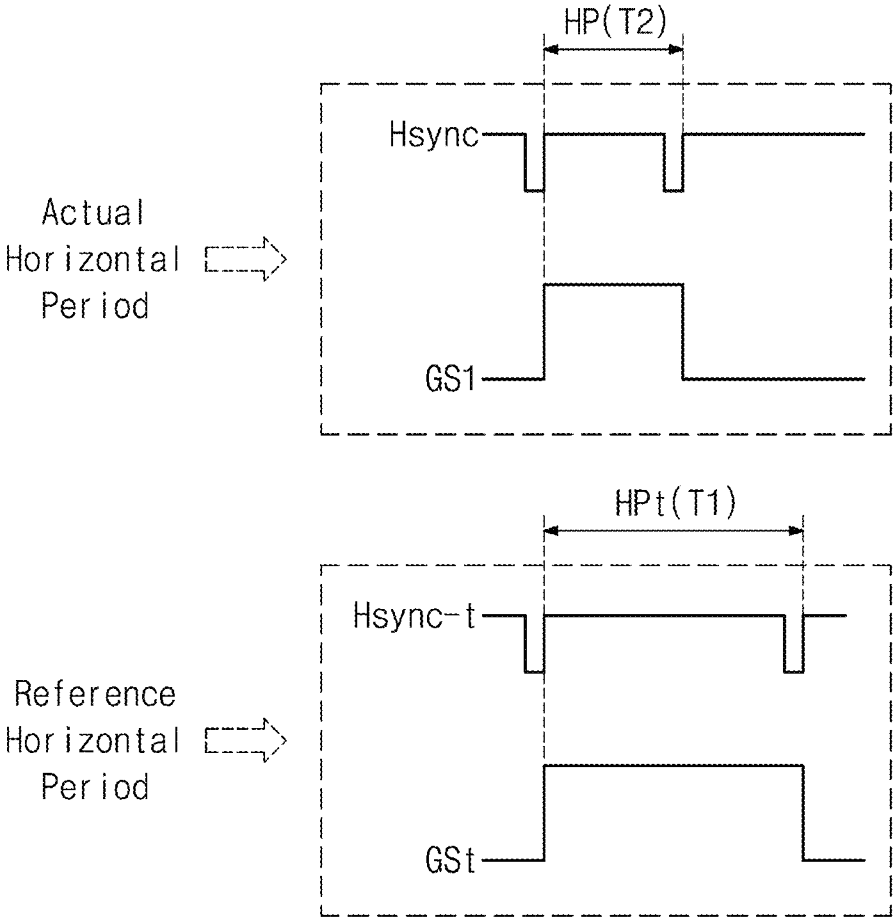
FIG. 4 is a timing diagram showing an exemplary embodiment of a reference horizontal period of a test mode and an actual horizontal period of a normal mode.

FIG. 1 is a perspective view showing a display device DD according to an exemplary embodiment of the invention. FIG. 2 is a block diagram shoving the display device DD according to an exemplary embodiment of the invention. FIG. 3 is a timing diagram showing an operation of the display device DD according to an exemplary embodiment of the invention. FIG. 4 is a timing diagram showing a reference horizontal period of a test mode and an actual horizontal period of a normal mode.

FIG. 1 shows a monitor as a representative example of the display device DD. In the illustrated exemplary embodiment, the monitor having a flat display surface DDS will be described as the display device DD, but the display device DD should not be limited to the monitor having the flat display surface DDS. In another exemplary embodiment, the display device DD may have a curved display surface. The display device DD according to the invention may be applied to a medium or large-sized electronic item, such as a notebook computer, a television set, etc., and a small-sized electronic item, such as a mobile phone, a tablet, a game unit, a smart watch, etc.

The display device DD includes the flat display surface DDS defined by a first direction DR1 and a second direction DR2. A third direction DR3 indicates a normal line direction of the flat display surface DDS, i.e., a thickness direction of the display device DD. Front (or upper) and rear (or lower) surfaces of each member of the display device DD are distinct from each other by the third direction DR3. However, directions indicated by the first, second, and third directions DR1, DR2, and DR3 are relative to each other, and thus the directions indicated by the first, second, and third directions DR1, DR2, and DR3 may be changed to other directions.

Referring to FIG. 2, the display device DD includes a display panel DP, a signal controller 100, a gate driving circuit 200, and a data driving circuit 300.

The display panel DP includes a plurality of gate lines GL1 to GLn, a plurality of data lines DL1 to DLm, and a plurality of pixels PX11 to PXnm where n and m are natural numbers. The gate lines GL1 to GLn extend in the first direction DR1 and are arranged in the second direction DR2. The data lines DL1 to DLm are insulated from the gate lines GL1 to GLn while crossing the gate lines GL1 to GLn. The gate lines GL1 to GLn are connected to the gate driving circuit 200, and the data lines DL1 to DLm are connected to the data driving circuit 300. The display panel DP may include a display area DA and a non-display area NDA surrounding the display area DA.

The pixels PX11 to PXnm are arranged in a matrix form. Each of the pixels PX11 to PXnm is connected to a corresponding gate line of the gate lines GL1 to GLn and a corresponding data line of the data lines DL1 to DLm. The pixels PX11 to PXnm may be disposed in the display area DA.

Although not shown in drawing figures, the signal controller 100 receives a plurality of image signals and a plurality of control signals from an external source. The signal controller 100 converts the image signals from the external source to image signals IR suitable for an operation mode of the display panel DP and applies the image signals IR to the data driving circuit 300. Here, the image signals IR may be, but not limited to, digital signals.

In addition, the signal controller 100 receives the controls signals, e.g., a vertical synchronization signal, a horizontal synchronization signal, a main clock signal, a data enable signal, etc., and outputs a gate control signal G-CS and a control signal CS. The signal controller 100 applies the gate control signal G-CS to the gate driving circuit 200 and applies the control signal CS to the data driving circuit 300.

The gate driving circuit 200 outputs gate signals to the gate lines GL1 to GLn in response to the gate control signal G-CS. In an exemplary embodiment, the gate control signal G-CS includes a vertical start signal that starts an operation of the gate driving circuit 200, a gate clock signal that determines an output timing of a gate voltage, and an output enable signal that determines an on-pulse width of the gate voltage, for example.

The data driving circuit 300 receives the control signal CS and the image signals IR. The control signal CS includes a data control signal D-CS and a switching control signal S-CS shown in FIG. 5. The data driving circuit 300 converts the image signals IR to a plurality of data voltages in response to the data control signal D-CS and applies the data voltages to the data lines DL1 to DLm. In an exemplary embodiment, the data control signal D-CS includes a horizontal start signal that starts an operation of the data driving circuit 300, an inversion signal that inverts a polarity of the data voltages, and an output indicating signal that determines an output timing of the data voltages, for example.

In addition, the switching control signal S-CS may be a signal that controls an operation of a sensing circuit (refer to FIG. 5) included in the data driving circuit 300. The operation of the sensing circuit based on the switching control signal S-CS will be described in detail with reference to FIG. 5.

Hereinafter, an overall operation of the gate driving circuit 200 and the data driving circuit 300 will be described with reference to the timing diagram shown in FIG. 3.

Referring to FIGS. 2 and 3, the signal controller 100 may output a plurality of driving signals. As an example, the signal controller 100 applies a vertical synchronization signal Vsync to the gate driving circuit 200 to distinguish a unit frame period Fm. Here, the unit frame period Fm indicates a period in which one image is displayed. The vertical synchronization signal Vsync may be included in the gate control signal G-CS.

As an example, the signal controller 100 may apply a data enable signal DE having a high level to the data driving circuit 300 only during a predetermined period, in which data are output, to indicate a period in which a signal which distinguishes horizontal periods HP, i.e., a horizontal synchronization signal Hsync as a row distinction signal, and data are input. The horizontal synchronization signal Hsync and the data enable signal DE may be included in the data control signal D-CS. Referring to FIG. 4, a horizontal synchronization signal Hsync-t may refer to a horizontal synchronization signal during a test mode.

Although not shown in drawing figures, the gate control signal G-CS may include a clock signal and a clock bar signal to generate the gate signals GS1 to GSn at a high level.

Image data voltages DS output from the data driving circuit 300 include positive data voltages having a positive value with respect to a common voltage and/or negative data voltages having a negative value with respect to the common voltage. Among the image data voltages DS applied to the data lines DL1 to DLm during each of the horizontal periods HP, some image data voltages have the positive polarity, and the other image data voltages have the negative polarity. The polarity of the image data voltages DS may be inverted every one or more unit frame periods Fm to prevent liquid crystals from burning or deteriorating. The data driving circuit 300 may generate the image data voltages DS inverted in the unit of frame period in response to the inversion signal.

The gate driving circuit 200 generates the gate signals GS1 to GSn during the unit frame period Fm in response to the gate control signal G-CS provided from the signal controller 100. The gate driving circuit 200 applies the gate signals GS1 to GSn to the gate lines GL1 to GLn, respectively. The gate signals GS1 to GSn may be sequentially output corresponding to the horizontal periods HP. That is, an active period of each of the gate signals GS1 to GSn may correspond to one horizontal period HP.

In addition, the display panel DP includes a display period in which an image based on a corresponding frame is displayed and a blank period BP in which the image is not displayed. The display period in which the image is displayed corresponds to a period in which the image data voltages DS are output to the data lines DL1 to DLm, and the data enable signal DE has an active level during the display period. Further, the blank period BP corresponds to a period in which the image data voltages DS are not output to the data lines DL1 to DLm, and the data enable signal DE has an inactive level during the blank period.

The display device DD according to the exemplary embodiment of the invention may be applied to a large-sized electronic device. In this case, the number of the gate lines included in the display panel DP may increase. In the case that the number of the gate lines increases, the number of the gate signals output during the unit frame period Fm increases by the increase of the number of the gate lines.

However, in a case that the time of the unit frame period Fm does not increase in proportion to the increased number of the gate signals, each of the horizontal periods HP may be shortened due to the increased number of the gate signals. In the case that the horizontal period HP is shortened, the active period of each of the gate signals is shortened, and thus the image data voltage may not be sufficiently charged in the pixels.

In addition, in a case that the image data voltages having the same level are applied to the pixels connected to the same data line and different gate lines during the same horizontal period, the image data voltages charged in the pixels may have different levels from each other due to a line resistance.

According to the exemplary embodiment of the invention, the display device DD may be operated in one of a test mode that compensates for the level of the image data voltage and a normal mode that displays a real image. As an example, the test mode may be carried out at a time when the operation of the display device DD begins or at the time when the operation of the display device DD ends.

Referring to FIG. 4, a reference horizontal period HPt (hereinafter, referred to as a “first period”) indicates a time T1 during which a test data voltage is charged in the pixel in the test mode. Hereinafter, the first period HPt will be described as a period during which the test data voltage is sufficiently charged in the pixel. That is, a test gate signal GSt may be activated in the first period HPt, and the test data voltage may be sufficiently charged in the pixel during the active period of the test gate signal GSt. In addition, the first period HPt according to the invention will be described as a time during which the image data voltage is sufficiently charged in the pixel in the normal mode.

An actual horizontal period HP (hereinafter, referred to as a “second period”) indicates a time T2 during which the image data voltage is charged in the pixel in the normal mode. As an example, an active period of the first gate signal GS1 applied to the first gate line GL1 (refer to FIG. 2) is shown in FIG. 4.

As shown in FIG. 4, the second period HP is shorter than the first period HPt, and thus the voltage charged in the pixel during the second period HP is less charged than the voltage charged in the pixel during the first period HPt.

According to the exemplary embodiment of the invention, the signal controller 100 may compensate for the image data voltage based on a difference in amount between a current output to the pixel during the first period HPt in the test mode and a current output to the pixel during the second period HP in the test mode. This will be described in detail with reference to FIG. 5.

Figure 5:
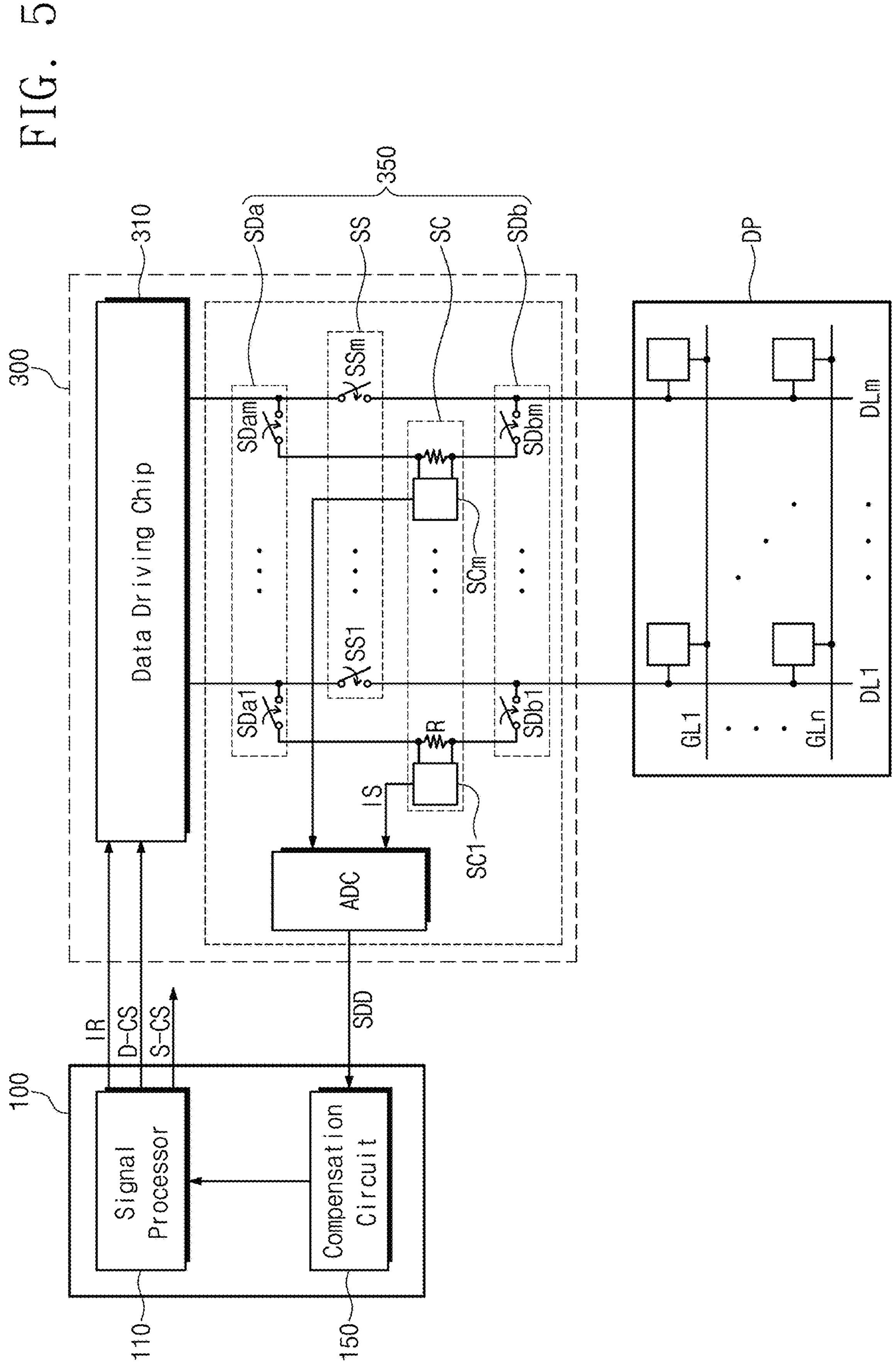
FIG. 5 is a circuit diagram showing an exemplary embodiment of a display device according to the invention.

FIG. 5 is a circuit diagram showing the display device according to an exemplary embodiment of the invention. Referring to FIG. 5, the display panel DP includes the pixels connected to the gate lines GL1 to GLn and the data lines DL1 to DLm. Hereinafter, the display panel DP will be described to include a plurality of pixel columns, and each of the pixel columns is connected to the same data line and different gate lines from each other. As an example, a first pixel column among the pixel columns includes first to n-th pixels connected to a first data line DL1 and the gate lines GL1 to GLn.

The signal controller 100 includes a signal processor 110 and a compensation circuit 150. The signal processor 110 outputs the image signals IR, the data control signal D-CS, and the switching control signal S-CS to a data driving chip 310. According to the exemplary embodiment, the image signals IR may include a test image signal and driving image signals. That is, the signal processor 110 outputs the test image signal to the data driving chip 310 in the test mode and outputs the driving image signals to the data driving chip 310 in the normal mode.

In addition, the signal processor 110 outputs the switching control signal S-CS to a sensing circuit unit 350. The switching control signal S-CS includes a first switching control signal and a second switching control signal to drive switches included in the sensing circuit unit 350.

The compensation circuit 150 calculates a compensation voltage level for the image data voltage applied to at least one compensation pixel among the pixels based on a sensing signal SDD provided from the sensing circuit unit 350. That is, the compensation circuit 150 applies a compensation signal having information regarding the compensation voltage level to the signal processor 110, and the signal processor 110 generates the driving image signals to which the compensation voltage level is applied.

The data driving circuit 300 includes the data driving chip 310 and the sensing circuit unit 350 electrically connected to the data driving chip 310. The sensing circuit unit 350 includes a switch group SS, a first sensing switching group SDa, a second sensing switching group SDb, a sensing circuit group SC, and an analog-to-digital converter ADC.

The data driving chip 310 outputs the test data voltage in the test mode in response to the test image signal and outputs the image data voltages in the normal mode in response to the driving image signals.

The switch group SS includes a plurality of switches SS1 to SSm corresponding to the number of the data lines DL1 to DLm. In particular, the switches SS1 to SSm are operated to electrically connect the data driving chip 310 to the pixel columns included in the display panel DP in the normal mode. In an exemplary embodiment, the signal processor 110 outputs a first switching control signal at an active level in the normal mode, and the switches SS1 to SSm are turned on in response to the first switching control signal at the active level, for example. As a result, the image data voltages output from the data driving chip 310 may be applied to the display panel DP through the switches SS1 to SSm.

The switches SS1 to SSm are operated to electrically separate the data driving chip 310 from the pixel columns in the test mode. In an exemplary embodiment, the signal processor 110 outputs a first switching control signal at an inactive level in the test mode, and the switches SS1 to SSm are turned off in response to the first switching control signal at the inactive level, for example. As a result, the image data voltages are not output from the data driving chip 310 in the test mode.

The first sensing switching group SDa includes a plurality of first sensing switches SDa1 to SDam corresponding to the number of the data lines DL1 to DLm. The first sensing switches SDa1 to SDam electrically separate or connect the data driving chip 310 from or to the sensing circuits SC1 to SCm.

The first sensing switches SDa1 to SDam are operated to electrically separate the data driving chip 310 from the pixel columns in the normal mode. In an exemplary embodiment, the signal processor 110 outputs the second switching control signal at the inactive level in the normal mode, and the first sensing switches SDa1 to SDam are turned off in response to the second switching control signal at the inactive level, for example. That is, the test data voltage is not output from the data driving chip 310 in the normal mode.

The first sensing switches SDa1 to SDam are operated to electrically connect the data driving chip 310 to the pixel columns in the test mode. In an exemplary embodiment, the signal processor 110 outputs the second switching control signal at the active level in the test mode, and the first sensing switches SDa1 to SDam are turned on in response to the second switching control signal at the active level, for example. As a result, the test data voltage output from the data driving chip 310 may be applied to the pixel columns through the first sensing switches SDa1 to SDam.

The second sensing switching group SDb includes a plurality of second sensing switches SDb1 to SDbm corresponding to the number of the data lines DL1 to DLm. The second sensing switches SDb1 to SDbm electrically separate or connect the sensing circuits SC1 to SCm from or to the pixel columns.

The second sensing switches SDb1 to SDbm are operated to electrically separate the data driving chip 310 from the pixel columns in the normal mode. In an exemplary embodiment, the signal processor 110 outputs the second switching control signal at the inactive level in the normal mode, and the second sensing switches SDb1 to SDbm are turned off in response to the second switching control signal at the inactive level, for example. That is, the test data voltage is not output from the data driving chip 310 in the normal mode.

The second sensing switches SDb1 to SDbm are operated to electrically connect the data driving chip 310 to the pixel columns in the test mode. In an exemplary embodiment, the signal processor 110 outputs the second switching control signal at the active level in the test mode, and the second sensing switches SDb1 to SDbm are turned on in response to the second switching control signal at the active level, for example. As a result, the test data voltage output from the data driving chip 310 may be applied to the pixel columns through the second sensing switches SDb1 to SDbm.

The sensing circuit group SC includes the sensing circuits SC1 to SCm corresponding to the number of data lines DL1 to DLm. Each of the sensing circuits SC1 to SCm is connected to both ends of a corresponding resistor among resistors R connected between the first sensing switches SDa1 to SDam and the second sensing switches SDb1 to SDbm. Here, the resistors R may be set to the same value with each other to sense a current. The sensing circuits SC1 to SCm are electrically connected to the data driving chip 310 and the pixel columns since the first sensing switches SDa1 to SDam and the second sensing switches SDb1 to SDbm are turned on in the test mode. In addition, the sensing circuits SC1 to SCm are electrically separated from the data driving chip 310 and the pixel columns since the first sensing switches SDa1 to SDam and the second sensing switches SDb1 to SDbm are turned off in the normal mode.

The sensing circuits SC1 to SCm sense the current output to the pixel columns by the test data voltage during the first period HPt described in FIG. 4 in the test mode, and sense the current output to the pixel columns by the test data voltage during the second period HP in the test mode.

The sensing circuits SC1 to SCm output a first current IS sensed during the first period HPt to the analog-to-digital converter ADC, and the analog-to-digital converter ADC applies the sensing signal SDD corresponding to the first current IS to the compensation circuit 150.

In addition, the sensing circuits SC1 to SCm output a second current IS sensed during the second period HP to the analog-to-digital converter ADC, and the analog-to-digital converter ADC applies the sensing signal SDD corresponding to the second current IS to the compensation circuit 150.

Figure 6:
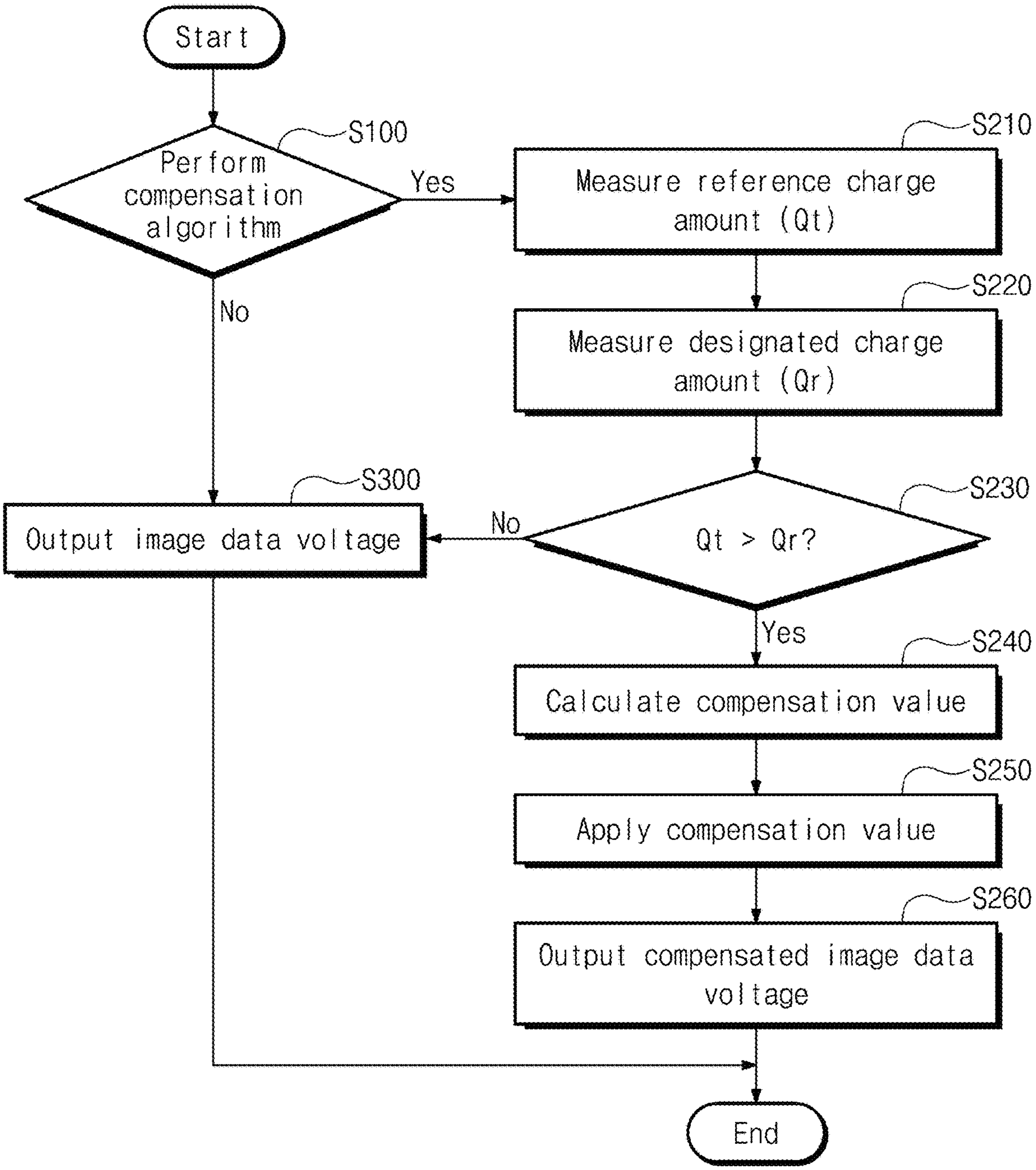
FIG. 6 is a flowchart showing an exemplary embodiment of an operation of compensating for a data voltage according to the invention.
Figure 7A:
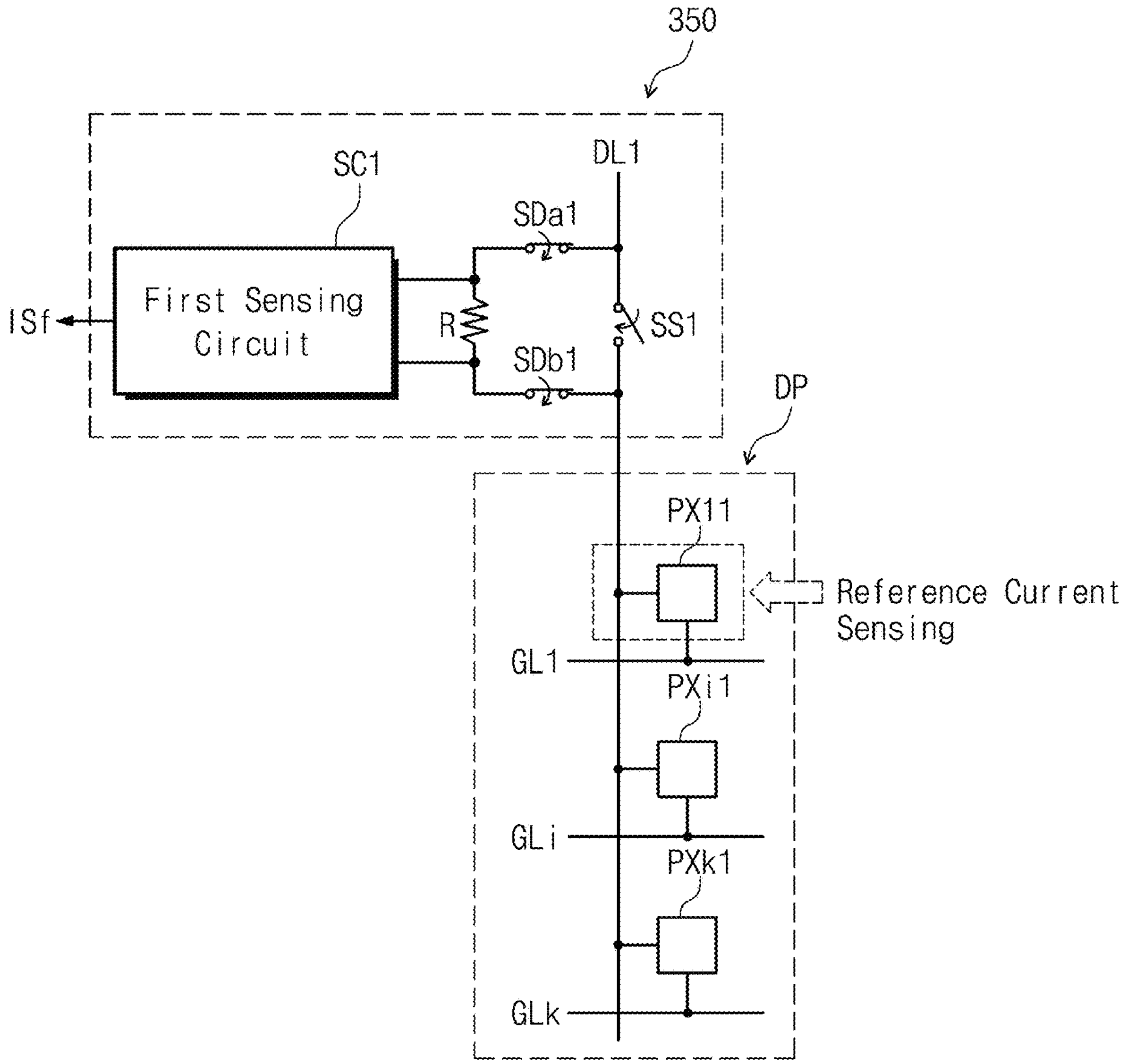
FIG. 7A is a circuit diagram showing an exemplary embodiment of a sensing circuit according to the invention.
Figure 7B:
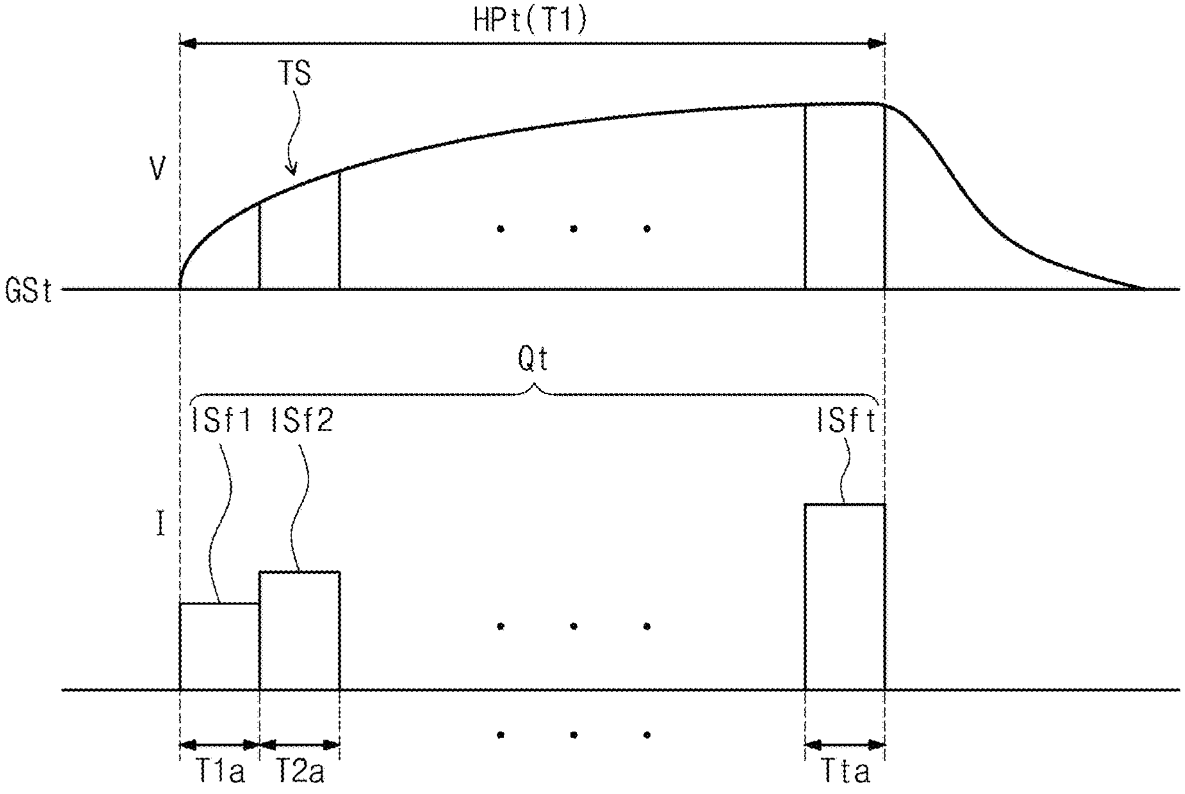
FIG. 7B is a timing diagram showing a sensing value of a reference current shown in FIG. 7A.
Figure 8A:
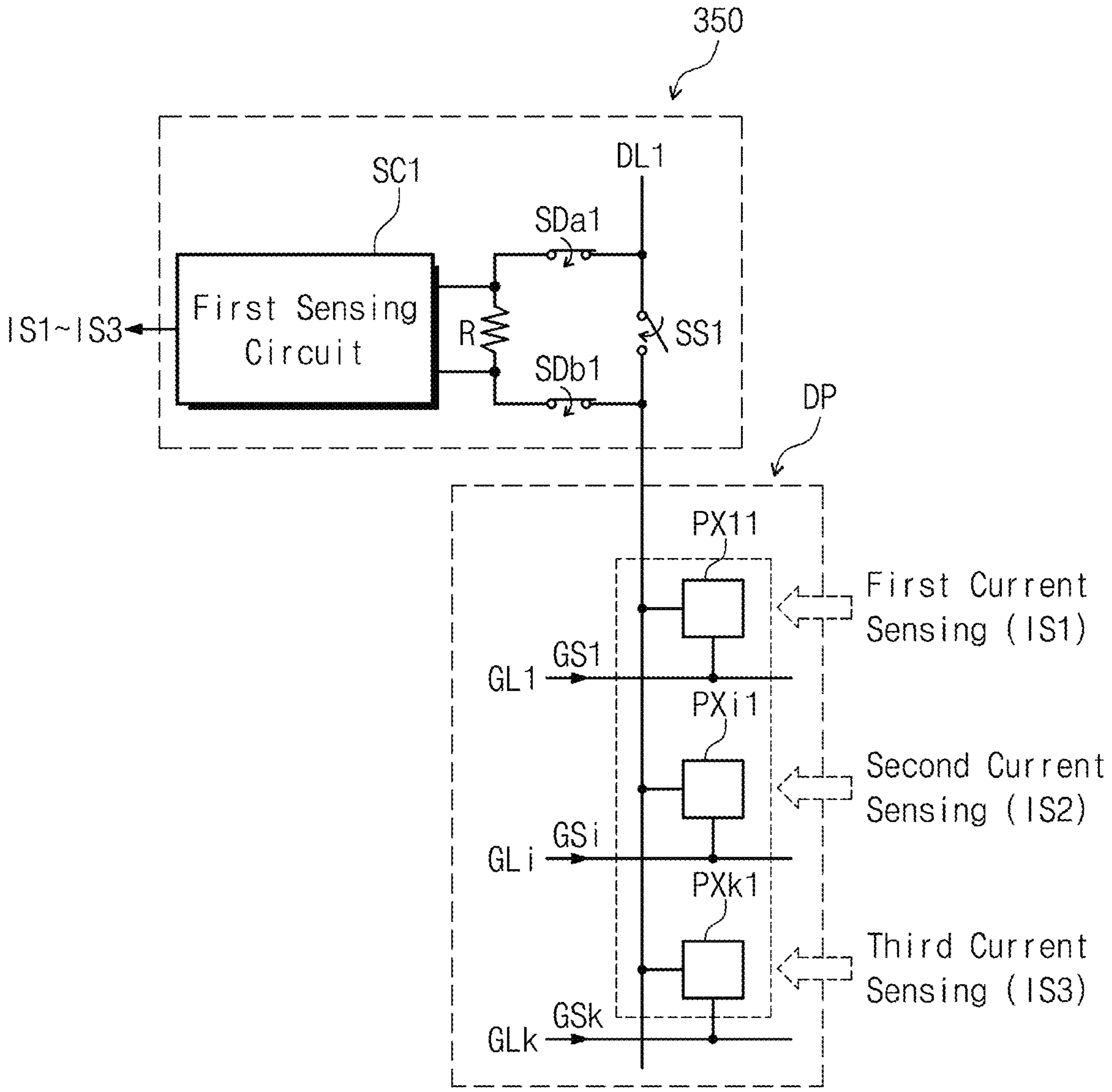
FIG. 8A is a circuit diagram showing an exemplary embodiment of a sensing circuit according to the invention.
Figure 8B:
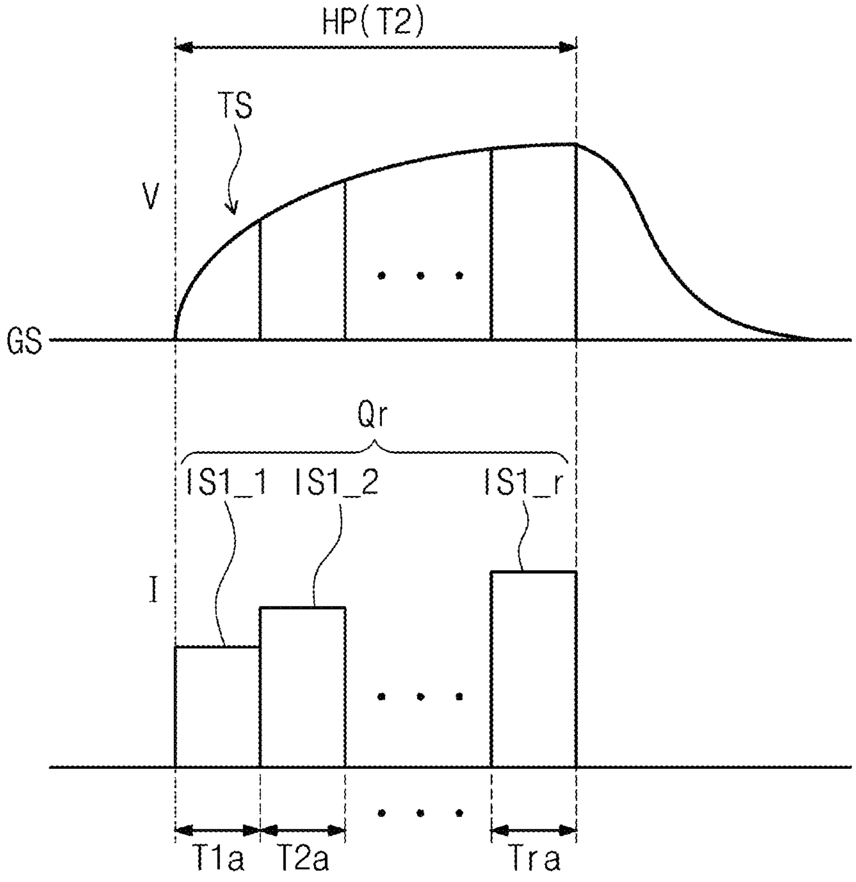
FIG. 8B is a timing diagram showing a sensing value of a reference current shown in FIG. 8A.

FIG. 6 is a flowchart showing an operation of compensating for the data voltage according to an exemplary embodiment of the invention. FIG. 7A is a circuit diagram showing the sensing circuit according to an exemplary embodiment of the invention. FIG. 7B is a timing diagram showing a sensing value of a reference current shown in FIG. 7A. FIG. 8A is a circuit diagram showing the sensing circuit according to an exemplary embodiment of the invention. FIG. 8B is a timing diagram showing a sensing value of a current shown in FIG. 8A.

Hereinafter, the method of compensating for the image data voltages applied to the pixel columns of the display panel DP in the normal mode will be described with reference to FIGS. 6 to 8B. For the convenience of explanation, the method of compensating for the image data voltages applied to the first pixel column connected to the first data line DL1 and the gate lines GL1 to GLn among the pixel columns of the display panel DP will be described.

Referring to FIGS. 5 and 6, the signal controller 100 determines whether to perform a compensation algorithm that determines which mode the display device DD is to be operated in between the test mode and the normal mode (S100).

In the case that the display device DD is operated in the test mode (YES), the signal controller 100 calculates a reference charge amount Qt (S210). A method of calculating the reference charge amount Qt will be described in detail with reference to FIGS. 7A and 7B.

First, the data driving chip 310 (refer to FIG. 5) may output the test data voltage TS to the first data line DL1 in the test mode as shown in FIG. 7B. A line resistance of the first data line DL1 may increase as it goes from the first pixel to the n-th pixel. As a result, the first sensing circuit SC1 senses a reference current ISf output to the first pixel PX11 having the smallest line resistance among the pixels included in the first pixel column during the first period HPt, but it should not be limited thereto or thereby. That is, in another exemplary embodiment, the first sensing circuit SC1 may sense the reference current ISf output to one pixel among the pixels included in the first pixel column during the first period HPt.

That is, the first sensing circuit SC1 may sense the reference current ISf output to the first pixel PX11 during the first period HPt in which the test data voltage TS is charged in the first pixel PX11. In addition, in the case that the test data voltage TS is output to the first pixel PX11 during the first period HPt, the test gate signal GSt may be applied to the first gate line GL1.

The first period HPt may include a plurality of first sub-periods T1*a* to Tta. The compensation circuit 150 (refer to FIG. 5) may calculate the reference charge amount Qt based on reference current amounts ISf1 to ISft sensed respectively during the first sub-periods T1*a* to Tta. The reference charge amount Qt may be determined by a sum of the reference current amounts ISf1 to ISft.

FIG. 7A shows the first pixel PX11, an i-th pixel PXi1, and a k-th pixel PXk1 among the first to n-th pixels. Here, each of “i” and “k” is a natural number, and “i” is smaller than “k”.

Then, the signal controller 100 calculates a designated charge amount Qr (S220). The method of calculating the designated charge amount Qr will be described in detail with reference to FIGS. 8A and 8B. In the following descriptions, designated charge amounts Qr1, Qr2, and Qr3 of the first pixel PX11, the i-th pixel PXi1, and the k-th pixel PXk1 among the pixels included in the first pixel column will be described.

The data driving chip 310 may apply the test data voltage TS to the first data line DL1 in the test mode as shown in FIG. 8B.

The first sensing circuit SC1 senses a first current IS1 output to the first pixel PX11 during the second period HP in which the test data voltage TS is charged in the first pixel PX11. In the case that the test data voltage TS is applied to the first pixel PX11 during the second period HP, the first gate signal GS1 may be applied to the first gate line GL1.

The second period HP may include a plurality of second sub-periods T1*a* to Tra. The signal controller 100 may calculate a first designated charge amount Qr1 of the first pixel PX11 based on designated charge amounts IS1_1 to IS1_*r* sensed respectively during the second sub-periods T1*a* to Tra. The first designated charge amount Qr1 may be determined by a sum of the designated charge amounts IS1_1 to IS1_*r*.

The first sensing circuit SC1 senses a second current IS2 output to the i-th pixel PXi1 during the second period HP in which the test data voltage TS is charged in the i-th pixel PXi1. In the case that the test data voltage TS is applied to the i-th pixel PXi1 during the second period HP, an i-th gate signal GSi may be applied to the i-th gate line GLi.

Similarly, the signal controller 100 may calculate a second designated charge amount Qr2 of the i-th pixel PXi1 based on the designated charge amounts IS1_1 to IS1_*r* sensed respectively during the second sub-periods T1*a* to Tra. The second designated charge amount Qr2 may be determined by a sum of the designated charge amounts IS1_1 to IS1_*r*.

The first sensing circuit SC1 senses a third current IS3 output to the k-th pixel PXk1 during the second period HP in which the test data voltage TS is charged in the k-th pixel PXk1. In the case that the test data voltage TS is applied to the k-th pixel PXk1 during the second period HP, a k-th gate signal GSk may be applied to the k-th gate line GLk.

Similarly, the signal controller 100 may calculate a third designated charge amount Qr3 of the k-th pixel PXk1 based on the designated charge amounts IS1_1 to IS1_*r* sensed respectively during the second sub-periods T1*a* to Tra. The third designated charge amount Qr3 may be determined by a sum of the designated charge amounts IS1_1 to IS1_*r*.

In the illustrated exemplary embodiment, the reference current ISf and the first to third currents IS1 to IS3 may have substantially the same level as each other. This is because the reference current ISf and the first to third currents IS1 to IS3 have a current level caused by the test data voltage.

The first to third designated charge amounts Qr1 to QR3 may be different from each other. In detail, due to the line resistance of the data line, the first designated charge amount Qr1 may be greater than the second designated charge amount Qr2, and the second designated charge amount Qr2 may be greater than the third designated charge amount Qr3.

Then, the signal controller 100 compares the reference charge amount Qt to each of the first to third designated charge amounts Qr1 to Qr3 (S230).

In the case that the reference charge amount Qt is smaller than the designated charge amount Qr (No), the signal controller 100 terminates the test mode, and the data driving chip 310 outputs the image data voltage based on the normal mode (S300). That is, in the case that the designated charge amount Qr is greater than the reference charge amount Qt (Yes), the image data voltage may be sufficiently charged in the pixel during the second period HP in the normal mode.

In the case that the display device DD is operated in the normal mode (No) in operation S100 determining whether to perform the above-mentioned compensation algorithm, the data driving chip 310 outputs the image data voltage based on the normal mode (S300).

In the case that the designated charge amount Qr is greater than the reference charge amount Qt (Yes in S230), the signal controller 100 may calculate compensation values to respectively compensate for the levels of the image data voltages applied to the first pixel PX11, the i-th pixel PXi1, and the k-th pixel PXk1 in the normal mode based on the compared result (S240).

Next, the signal controller 100 converts the image signals applied to the first pixel PX11, the i-th pixel PXi1, and the k-th pixel PXk1 to image signals to which the compensation values are applied (S250).

The data driving chip 310 applies the compensated image data voltages to the first pixel PX11, the i-th pixel PXi1, and the k-th pixel PXk1, respectively, during the second period HP (S260).

According to the illustrated exemplary embodiment, the signal controller 100 applies the image signals to which the compensation values are applied to the data driving chip 310 in the normal mode, but it should not be limited thereto or thereby. That is, the signal controller 100 may provide calculated compensation information to the data driving chip 310, and the data driving chip 310 may output the compensated image data voltage.

According to the illustrated exemplary embodiment, the first pixel column may include a first pixel group and a second pixel group. In the following description, the i-th pixel is included in the first pixel group, and the k-th pixel is included in the second pixel group. The first pixel is included in a third pixel group.

As an example, the signal controller 100 may compensate for the level of the image data voltages applied to the pixels of the first pixel group in the normal mode based on the compared result between the reference charge amount Qt and the second designated charge amount Qr2.

As an example, the signal controller 100 may compensate for the level of the image data voltages applied to the pixels of the second pixel group in the normal mode based on the compared result between the reference charge amount Qt and the third designated charge amount Qr3.

As an example, the signal controller 100 may compensate for the level of the image data voltages applied to the pixels of the third pixel group in the normal mode based on the compared result between the reference charge amount Qt and the first designated charge amount Qr1.

Figure 9:
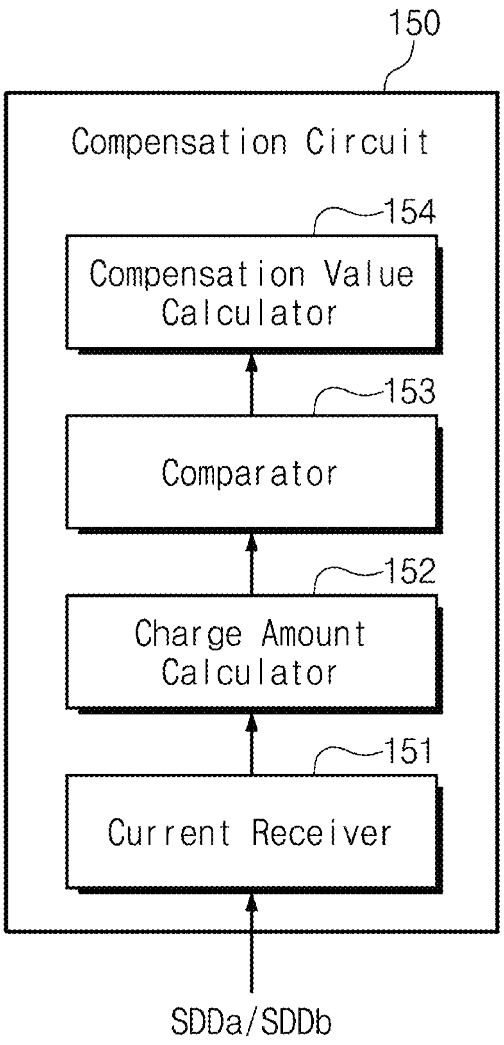
FIG. 9 is a block diagram showing an exemplary embodiment of a compensation circuit according to the invention.
Figure 11A:
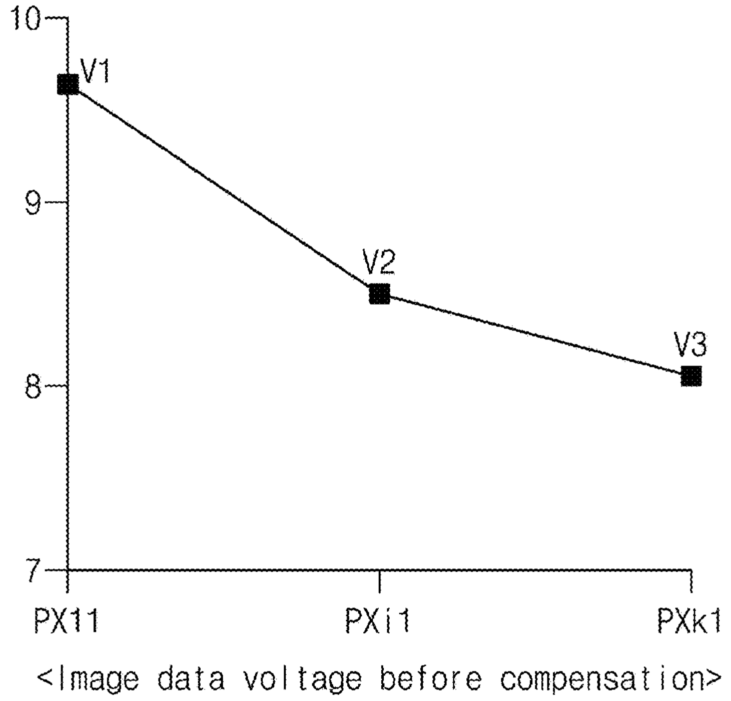
FIGS. 11A and 11B are graphs showing a level of the image data voltage charged in a pixel.
Figure 11B:
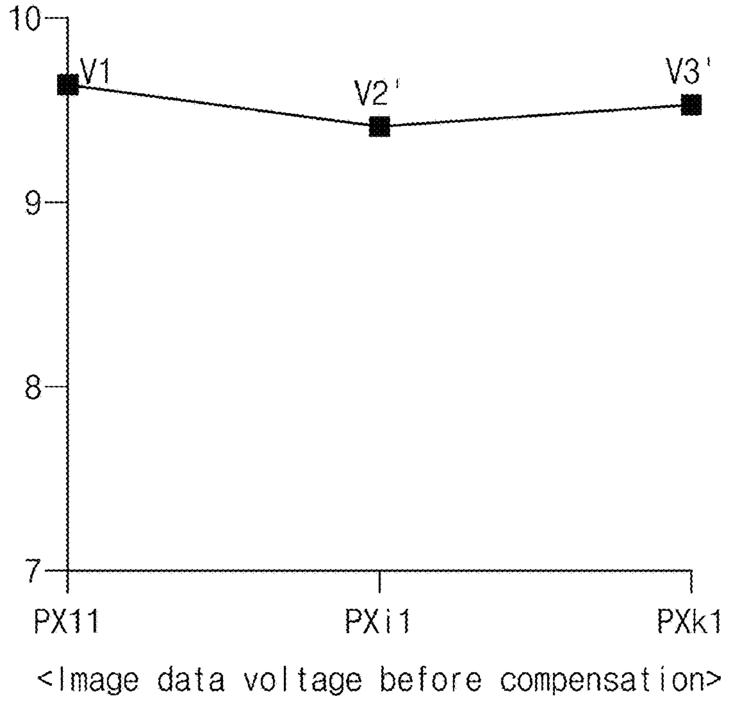

FIG. 9 is a block diagram showing a compensation circuit according to an exemplary embodiment of the invention. FIG. 10 is a table showing a compensated image data voltage compensated according to an exemplary embodiment of the invention. FIGS. 11A and 11B are graphs showing a level of the image data voltage charged in a pixel.

Referring to FIGS. 9 and 10, the compensation circuit 150 includes a current receiver 151, a charge amount calculator 152, a comparator 153, and a compensation value calculator 154.

The current receiver 151 receives a first sensing signal SDDa having sensing information regarding the reference current ISf (refer to FIG. 7B) from the analog-to-digital converter ADC included in the sensing circuit unit 350 (refer to FIGS. 5, 7A and 8A) and a second sensing signal SDDb having sensing information regarding the first to third currents IS1 to IS3 described with reference to FIG. 8B. The current receiver 151 applies the first sensing signal SDDa and the second sensing signal SDDb to the charge amount calculator 152.

In another exemplary embodiment, the current receiver 151 may be omitted. In this case, the analog-to-digital converter ADC directly applies the first sensing signal SDDa and the second sensing signal SDDb to the charge amount calculator 152.

The charge amount calculator 152 calculates the reference charge amount Qt based on the first sensing signal SDDa and calculates the designated charge amount Qr based on the second sensing signal SDDb. As an example, the charge amount calculator 152 may calculate the first to third designated charge amounts Qr1 to Qr3 based on the second sensing signal SDDb. The charge amount calculator 152 may perform operations S210 and S220 shown in FIG. 6. The charge amount calculator 152 applies information regarding the calculated reference charge amount Qt and the calculated first to third designated charge amounts Qr1 to Qr3 to the comparator 153.

The comparator 153 compares the reference charge amount Qt to each of the first to third designated charge amounts Qr1 to Qr3. The comparator 153 may perform operation S230 shown in FIG. 6.

In the case that the reference charge amount Qt is greater than the designated charge amount Qr, the compensation value calculator 154 calculates the compensation value. In detail, the compensation value calculator 154 calculates the compensated image data voltage by the following Equation 1.

$$Vd = Vo\left(1 - \frac{Qr}{Qt} \times \frac{1 - e^{-Ro/T2}}{1 - e^{-Rc/T1}}\right) \quad \langle\text{Equation 1}\rangle$$

In Equation 1, Vo denotes an initial image data voltage, Vd denotes the compensated image data voltage, Qr denotes the designated charge amount, Qt denotes the reference charge amount, and Ro denotes an order of the gate line to which the pixel corresponding to the designated charge amount Qr is connected among the gate lines GL1 to GLn. As an example, in the case of the i-th pixel PXi1 corresponding to the first designated charge amount Qr1, Ro is 1. Rc denotes an order of the gate line disposed in the middle of the gate lines GL1 to GLn. That is, in the case of an m-th gate line connected to an m-th pixel that is disposed in the middle of the first to n-th pixels, Rc is m. Here, "m" is a natural number. In addition, T1 denotes the first time T1, and T2 denotes the second time T2 as described in FIG. 4.

As an example, when assuming that the comparator 153 determines that the difference between the reference charge amount Qt and the first designated charge amount Qr1 has an error range of substantially 0%, the compensation value calculator 154 applies a compensation signal to the signal processor 110 (refer to FIG. 5) such that the image data voltage DS before compensation and the image data voltage DS' after compensation, which are provided to the first pixel PX11, are maintained to be the same.

That is, as shown in FIGS. 11A and 11B, in a case that the image data voltage DS before compensation has a first voltage (V1) level, the image data voltage DS' after compensation may have the first voltage (V1) level. In an exemplary embodiment, since the first pixel PX11 has the smallest line resistance, the image data voltage DS' after compensation is not applied to the first pixel PX11, and the image data voltage DS before compensation is applied to the first pixel PX11, for example.

As an example, when assuming that the comparator 153 determines that the difference between the reference charge amount Qt and the second designated charge amount Qr2 has an error range of about −0.1%, the compensation value calculator 154 applies a compensation signal to the signal processor 110 to compensate for the image data voltage DS before compensation, which is applied to the i-th pixel PXi1. That is, as shown in FIGS. 11A and 11B, in a case that the image data voltage DS before compensation has a second voltage (V2) level, the image data voltage DS' after compensation may be compensated to a second voltage (V2') level.

As an example, when assuming that the comparator 153 determines that the difference between the reference charge amount Qt and the third designated charge amount Qr3 has an error range of about −0.2%, the compensation value calculator 154 applies a compensation signal to the signal processor 110 to compensate for the image data voltage DS before compensation, which is applied to the k-th pixel PXk1. That is, as shown in FIGS. 11A and 11B, in a case that the image data voltage DS before compensation has a third voltage (V3) level, the image data voltage DS' after compensation may be compensated to a third voltage (V3') level. In this case, the voltage level of the third voltage V3' after compensation from the third voltage V3 may be greater than the voltage level of the second voltage V2' after compensation from the second voltage V2.

Figure 12:
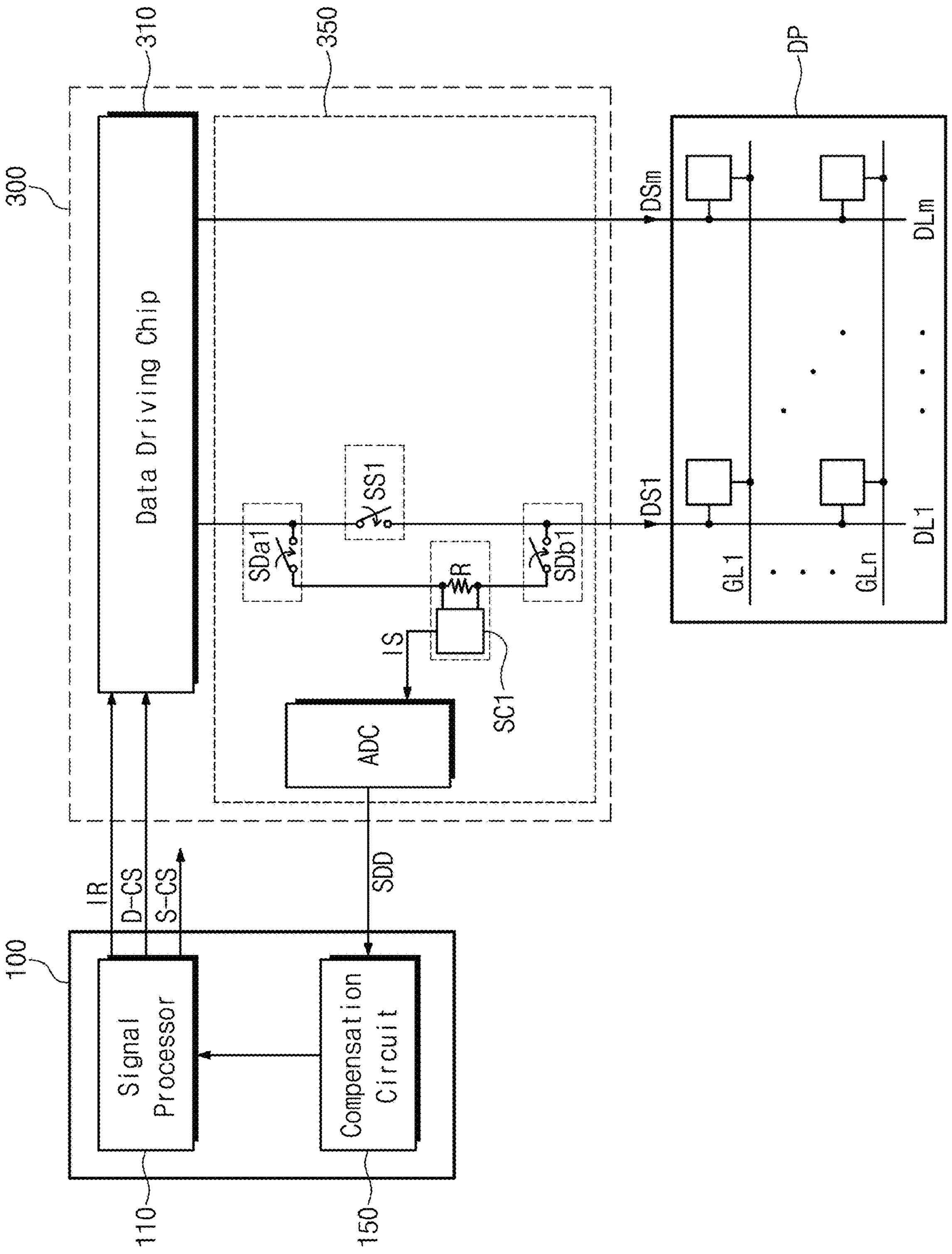
FIG. 12 is a circuit diagram showing another exemplary embodiment of a display device according to the invention.

FIG. 12 is a circuit diagram showing a display device according to another exemplary embodiment of the invention.

The display device shown in FIG. 12 has the same configuration and functions as those of the display device shown in FIG. 5 except for configuration and operations of a sensing circuit unit 350. Accordingly, detailed descriptions of the same configuration and functions will be omitted.

The sensing circuit unit 350 shown in FIG. 12 includes one switch SS1, one first sensing switch SDa1, one second sensing switch SDb1, and one sensing circuit SC1. That is, the display device shown in FIG. 12 may perform a compensation operation on image data voltages applied to pixels connected to one data line (e.g., DL1).

As described above, optimal exemplary embodiments have been disclosed in the drawings and the specification. Although specific terms have been used herein, these are only intended to describe the exemplary embodiments and are not intended to limit the meanings of the terms or to restrict the scope of the accompanying claims. Accordingly, those skilled in the art will appreciate that various modifications and other equivalent exemplary embodiments a e possible from the above exemplary embodiments. Therefore, the scope of the claims should be defined by the technical spirit of the specification.

What is claimed is:

1. A display device comprising:
a pixel column comprising first to n-th pixels connected to a data line and respectively connected to gate lines;
a data driving chip which outputs a test data voltage in a test mode and outputs image data voltages in a normal mode;
a sensing circuit electrically which is connected to the data line and the data driving chip in the test mode, senses a current output to the first pixel by the test data voltage during a first period, and senses a current output to an i-th pixel by the test data voltage during a second period shorter than the first period; and
a signal controller which compares a reference charge amount calculated based on the current sensed during the first period to a first charge amount calculated based on the current sensed during the second period and compensates for a level of an image data voltage applied to the i-th pixel among the image data voltages based on a compared result.

2. The display device of claim 1, wherein the pixel column further comprises a first pixel group and a second pixel group, and the signal controller compensates for a level of the image data voltages applied to the pixels of the first pixel group based on the compared result between the reference charge amount and the first charge amount.

3. The display device of claim 2, wherein the pixel column further comprises a third pixel group, and the signal controller constantly maintains a level of the image data voltages applied to the pixels of the third pixel group based on the compared result between the reference charge amount and the first charge amount.

4. The display device of claim 2, wherein the sensing circuit senses a current output to a k-th pixel by the test data voltage in the test mode during the second period, and the signal controller compares the reference charge amount to a second charge amount calculated by sensing the current output to the k-th pixel during the second period and compensates for the level of the image data voltages applied to the pixels of the second pixel group based on a compared result between the reference charge amount and the second charge amount.

5. The display device of claim 1, wherein each of the pixel column and the sensing circuit is provided in a plural number, and the sensing circuits are respectively connected to the pixel columns in the test mode.

6. The display device of claim 1, wherein the signal controller applies a test image signal corresponding to the test data voltage to the data driving chip in the test mode and applies image signals corresponding to the image data voltages to the data driving chip in the normal mode.

7. The display device of claim 1, further comprising a switch electrically connecting the data driving chip to the pixel column in the normal mode and electrically separating the data driving chip from the pixel column in the test mode.

8. The display device of claim 7, further comprising a sensing switch which electrically separates the sensing circuit from the data driving chip in the normal mode and electrically connects the sensing circuit to the data driving chip in the test mode.

9. The display device of claim 8, wherein the sensing switch comprises a first sensing switch and a second sensing switch, which are connected to the sensing circuit, the first sensing switch electrically connects or separates the data driving chip to or from the sensing circuit, and the second sensing switch electrically connects or separates the sensing circuit to or from the pixel column.

10. The display device of claim 8, wherein the signal controller outputs a first switching control signal to control an operation of the switch and a second switching control signal to control an operation of the sensing switch.

11. The display device of claim 10, wherein the switch is turned on in response to an active level of the first switching control signal in the normal mode, the switch is turned off in response to an inactive level of the first switching control signal in the test mode, the sensing switch is turned off in response to an inactive level of the second switching control signal in the normal mode, and the sensing switch is turned on in response to an active level of the second switching control signal in the test mode.

12. The display device of claim 1, wherein the signal controller comprises a compensation circuit electrically connected to the sensing circuit to calculate the reference charge amount and the first charge amount.

13. The display device of claim 12, wherein the compensation circuit stores information about the reference charge amount of at least one pixel among the first to n-th pixels.

14. The display device of claim 12, wherein the compensation circuit comprises:

a charge amount calculator which calculates the reference charge amount and the first charge amount;

a comparator which compares the reference charge amount to the first charge amount; and a compensator which compensates for the level of the image data voltage applied to the i-th pixel based on the compared result between the reference charge amount and the first charge amount.

15. The display device of claim 1, wherein the second period is a time during which the compensated image data voltage is charged in the i-th pixel in the normal mode.

16. A method of driving a display device, the method comprising:

sensing a current output to a first pixel by a test data voltage output from a data driving chip among first to n-th pixels connected to a data line and respectively connected to gate lines during a first period in a test mode;

sensing a current output to an i-th pixel by the test data voltage among the first to n-th pixels during a second period shorter than the first period in the test mode;

comparing a reference charge amount calculated based on the current sensed during the first period to a designated charge amount calculated based on the current sensed during the second period; and compensating for a level of an image data voltage applied to the i-th pixel from the data driving chip based on a compared result in the normal mode.

17. The method of claim 16, further comprising determining whether to perform the test mode or the normal mode, wherein the data driving chip outputs image data voltages in the normal mode, and the data driving chip outputs the test data voltage in the test mode.

18. The method of claim 16, wherein, when the reference charge amount is greater than the designated charge amount, the compensating is performed, and when the reference charge amount is smaller than the designated charge amount, the normal mode is performed.

19. The method of claim 16, wherein a switch which electrically connects the data driving chip to the first to n-th pixels is turned on in the normal mode and turned off in the test mode.

20. The method of claim 19, wherein a sensing switch which electrically connects the data driving chip to each of the first to n-th pixels is turned off in the normal mode and turned on in the test mode.

* * * * *